July 27, 1948.　　　C. W. HAWTHORNE　　　2,446,133
ROTARY SHAFT COUPLING
Filed June 26, 1944

INVENTOR
CHARLES W. HAWTHORNE
BY Albert G. Blodgett
ATTORNEY

Patented July 27, 1948

2,446,133

UNITED STATES PATENT OFFICE 2,446,133

ROTARY SHAFT COUPLING

Charles W. Hawthorne, Conneautville, Pa., assignor to Morgan Construction Company, Worcester, Mass., a corporation of Massachusetts Application June 26, 1944, Serial No. 542,105

5 Claims. (Cl. 64—28)

This invention relates to rotary shaft couplings for the transmission of power, and more particularly to couplings of the type having a frangible element arranged to serve as a safety device by limiting the torque-transmitting capacity of the coupling.

It is one object of the invention to provide a safety coupling so constructed that its torque-transmitting capacity may be predetermined with considerable accuracy.

It is a further object of the invention to provide a comparatively simple and inexpensive safety coupling which will suffer only minor damage when its torque-transmitting capacity is exceeded.

It is a further object of the invention to provide a safety coupling having an inexpensive frangible element adapted to break when a predetermined maximum torque is applied to the coupling, the construction being such that no damage will be done to the other parts of the coupling.

With these and other objects in view, as will be apparent to those skilled in the art, the invention resides in the combination of parts set forth in the specification and covered by the claims appended hereto.

Referring to the drawings illustrating one embodiment of the invention and in which like reference numerals indicate like parts, Fig. 1 is a longitudinal section through a rotary shaft coupling, taken on the line 1—1 of Fig. 2;

Figure 1:
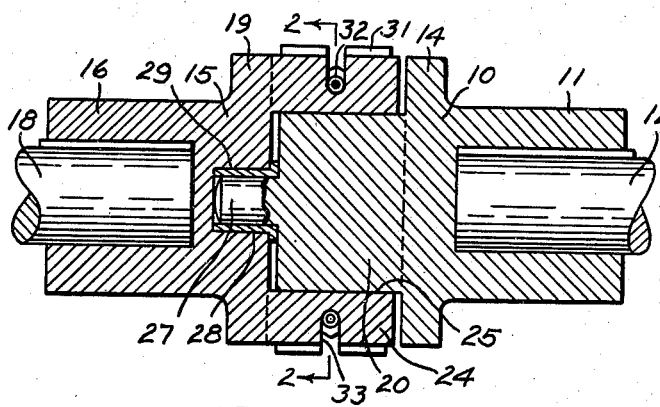
Figure 2:
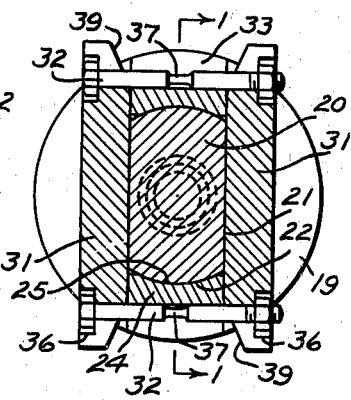
Fig. 2 is a section on the line 2—2 of Fig. 1.
Figure 3:
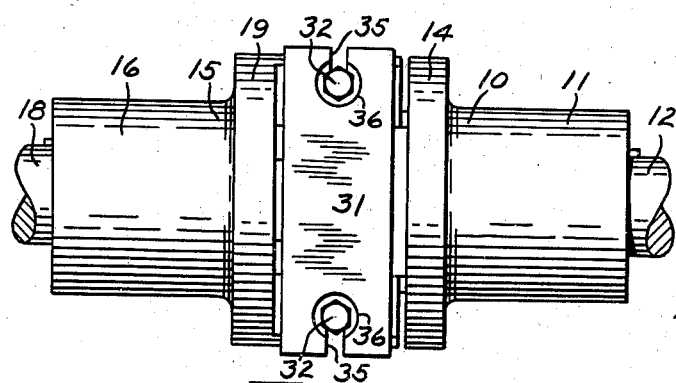
Fig. 3 is an elevation of the coupling.
Figure 4:
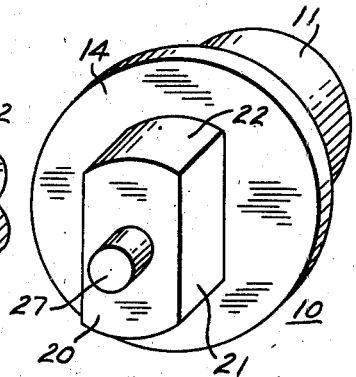
Fig. 4 is a perspective view of the driving element of the coupling.

The embodiment illustrated comprises a driving element 10 having a hub 11 keyed to a rotatable driving shaft 12 and provided with a flange 14. In axial alignment with the element 10 there is provided a driven element 15 having a hub 16 keyed to a rotatable driven shaft 18 and provided with a flange 19. The two flanges 14 and 19 are spaced apart axially. At the center of the driving element 10 there is formed a projection 20 of non-circular cross section which extends toward the driven element 10. This projection 20 is preferably shaped as a cylinder with portions on opposite sides removed to provide two parallel plane surfaces 21 equidistant from the axis and connected by two convex cylindrical arcuate surfaces 22 coaxial with the hub 11. The driven element 15 is provided with two diametrically opposed spaced lugs 24 which extend from the flange 19 toward the flange 14 on opposite sides of the projection 20. The inner surfaces 25 of these lugs are preferably concave to conform with the curvature of the surfaces 22 of the projection 20, and the width of the lugs 24 is substantially equal to that of the projection. At the center of the projection 20 there is provided a small cylindrical pilot boss 27 which enters a bushing 28 mounted in a recess 29 in the center of the driven element 15. This bushing 28 may be of the self-lubricating type.

Means is provided to prevent relative rotation of the driving and driven elements except under conditions of excessive torque. For this purpose two parallel generally rectangular flat bars 31 are mounted on opposite sides of the projection 20 to engage the flat surfaces 21 thereof and overlap the lugs 24. The ends of these bars are connected by means of two bolts 32 which extend through outwardly-open slots 33 in the lugs 24. These bolts also extend through outwardly-open slots 35 in the ends of the bars 31. Recesses or counterbores 36 are provided in the bars 31 to receive the heads and nuts of the bolts. The central portions 37 of the bolts are preferably weakened by turning them down to a predetermined diameter. The inner surfaces of the bars 31 are beveled near the ends of the bars, as shown at 39.

Figures 5, 6:
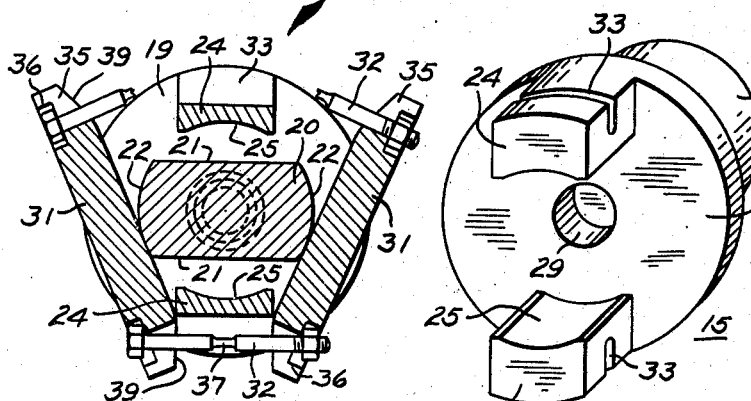
Fig. 5 is a perspective view of the driven element of the coupling.
Fig. 6 is a section similar to Fig. 2, but showing the effect of excessive torque on the coupling.

The operation of the invention will now be apparent from the above disclosure. The driving shaft 12 and the driving element 10 will be rotated by a suitable source of power, and the torque will be transmitted to the driven element 15 through the medium of the bars 31 and the bolts 32. These bolts will be stressed in tension, with the load equally divided between them to provide a force couple. From the known strength of the bolt material, the designer can readily predetermine the diameter of the portions 37 of the bolts necessary to transmit a desired torque without breaking. When this torque is exceeded, one or the other of the bolts will break, allowing the bars 31 to separate and the driven element 15 to remain stationary while the driving element 10 continues to rotate. The pilot boss 27 will aid in keeping the two parts of the coupling aligned under these conditions. Because of the beveled surfaces 39 on the bars 31, it is not necessary that both the bolts should break to release the coupling. As shown in Fig. 6, upon breakage of one bolt the bars can separate at one end while rocking on the lug 24 at their other ends without breaking the other bolt, thus forming a V-shaped structure within which the projection 20 may rotate freely.

Since breakage of one bolt will release the coupling, it is not essential that both bolts be weakened, but the construction illustrated provides a double protection against overloads.

Having thus described my invention, what I claim as new and desire to secure by Letters Patent is:

1. A rotary shaft coupling comprising two axially aligned rotatable members, a projection extending from one member toward the other member, the projection being shaped to provide two parallel plane surfaces equidistant from the axis and connected by two convex cylindrical surfaces coaxial with the members, two lugs extending from the said other member on opposite sides of the projection and having concave inner surfaces conforming with the curvature of the said cylindrical surfaces, the width of the lugs being substantially equal to that of the projection, two parallel flat bars mounted on opposite sides of the projection to engage the said plane surfaces and overlap the lugs, the inner surfaces of the bars being beveled near the ends of the bars, and tension devices connecting the ends of the bars so arranged that upon breakage of one of said devices the corresponding ends of the bars may separate while the beveled surfaces at the other ends rock on the adjacent lug, thus permitting relative rotation of the two members.

2. A rotary shaft coupling comprising two axially aligned rotatable members, a projection extending from one member toward the other member, the projection being shaped to provide two parallel plane surfaces equidistant from the axis and connected by two convex cylindrical surfaces coaxial with the members, two lugs extending from the said other member on opposite sides of the projection and having concave inner surfaces conforming with the curvature of the said cylindrical surfaces, the width of the lugs being substantially equal to that of the projection, two parallel flat bars mounted on opposite sides of the projection to engage the said plane surfaces and overlap the lugs, the end portions of the bars and the lugs having aligned outwardly-open slots therein, and bolts located in the slots to connect the ends of the bars and so arranged that upon breakage of the bolts the bars may separate to permit relative rotation of the two members.

3. A rotary shaft coupling comprising two coaxially mounted rotatable members, a projection extending from one member and shaped to provide two parallel plane surfaces equidistant from the axis, two lugs extending from the other member on opposite sides of the projection, the width of the lugs being substantially equal to that of the projection, two parallel bars mounted on opposite sides of the projection to engage the said plane surfaces and overlap the lugs, the inner surfaces of the bars being beveled near the ends of the bars, and tension devices connecting the ends of the bars so arranged that upon breakage of one of said devices the corresponding ends of the bars may separate while the beveled surfaces at the other ends rock on the adjacent lug, thus permitting relative rotation of the two members.

4. A rotary shaft coupling comprising two coaxially mounted rotatable members, a projection extending from one member, the projection being shaped to provide two parallel plane surfaces equidistant from the axis and connected by two convex cylindrical surfaces coaxial with the members, two lugs extending from the other member on opposite sides of the projection and having concave inner surfaces conforming with the curvature of the said cylindrical surfaces, the width of the lugs being substantially equal to that of the projection, two parallel flat bars mounted on opposite sides of the projection to engage the said plane surfaces and overlap the lugs, the inner surfaces of the bars being beveled near the ends of the bars, and tension devices connecting the ends of the bars so arranged that upon breakage of one of said devices the corresponding ends of the bars may separate while the beveled surfaces at the other ends rock on the adjacent lug, thus permitting relative rotation of the two members.

5. A rotary shaft coupling comprising two coaxially mounted rotatable members, a projection extending from one member, the projection being shaped to provide two parallel plane surfaces equidistant from the axis and connected by two convex cylindrical surfaces coaxial with the members, two lugs extending from the other member on opposite sides of the projection and having concave inner surfaces conforming with the curvature of the said cylindrical surfaces, the width of the lugs being substantially equal to that of the projection, two parallel flat bars mounted on opposite sides of the projection to engage the said plane surfaces and overlap the lugs, the end portions of the bars and the lugs having aligned outwardly-open slots therein, and bolts located in the slots to connect the ends of the bars and so arranged that upon breakage of the bolts the bars may separate to permit relative rotation of the two members.

CHARLES W. HAWTHORNE.

REFERENCES CITED

The following references are of record in the file of this patent:

UNITED STATES PATENTS

| Number | Name | Date |
| --- | --- | --- |
| 1,207,227 | Seybold | Dec. 5, 1916 |
| 2,439,380 | Ryding et al. | Dec. 19, 1922 |
| 2,362,592 | Spiller | Nov. 14, 1944 |